Oct. 24, 1972  A. LANDRY  3,700,406
STERILIZER UNIT FOR FLUID MEDIA
Filed March 12, 1971  2 Sheets-Sheet 1

INVENTOR.
ALFRED LANDRY
BY Knox & Knox

Oct. 24, 1972   A. LANDRY   3,700,406
STERILIZER UNIT FOR FLUID MEDIA
Filed March 12, 1971   2 Sheets-Sheet 2

*INVENTOR.*
ALFRED LANDRY
BY
*Knox & Knox*

United States Patent Office 3,700,406
Patented Oct. 24, 1972

3,700,406
STERILIZER UNIT FOR FLUID MEDIA
Alfred Landry, 7589 Calvocado Drive,
Lemon Grove, Calif. 92045
Continuation-in-part of abandoned application Ser. No. 728,408, May 13, 1968. This application Mar. 12, 1971, Ser. No. 123,869
Int. Cl. A61l 1/00, 3/00
U.S. Cl. 21—54 R
11 Claims

ABSTRACT OF THE DISCLOSURE

In a sterilizer unit for fluid media wherein a transparent pipe is used to conduct the fluid media and a source of germicidal radiation is used to irradiate the fluid media through the pipe, the improvement disclosed comprises the use of a pipe composed of fluorinated ethylene propylene in combination with ultraviolet lamps. Impurities contained in the fluid media being treated do not stick thereby prohibiting film buildup on the inner surface thereof so that the unit is operational over extended periods of time. In addition, decomposition of the fluid conducting pipe is avoided under extended exposure to ultraviolet rays.

RELATED APPLICATION

This application is a continuation-in-part of application Ser. No. 728,408 filed May 13, 1968, and now abandoned.

BACKGROUND OF THE INVENTION

Sterilizer units used for sterilizing fluid media such as milk and water are well known in the prior art. The most common method of sterilizing such fluid media is exposure by ultraviolet radiation from a germicidal lamp. In Pat. No. 2,457,761, a sterilizing unit having a plurality of transparent tubes used to conduct fluid media is exposed to a source of ultraviolet radiation. In this particular instance, the patentee disclosed the use of glass or other suitable transparent substances such as light passing synthetic resins in the construction of the tubing mounted within the sterilizing unit. In this particular patented apparatus, the patentee was interested in providing a portable device where fluid media, specifically milk, could be irradiated, even in the absence of refrigeration, by farmers. The patentee was interested in a small device which would be used to treat relatively small amounts of milk. Even though the apparatus was small, and small amounts of milk were being irradiated, it was necessary for the patentee to construct his device with several parts which were readily removable and replaceable to facilitate frequent and thorough cleaning of the apparatus.

At the present time, there is considerable need for a sterilizing unit which will be capable of handling large volumes of fluid media. This is due primarily to a much greater population demanding higher and more efficient productivity. In addition, a sterilizer unit is required to effect sterilization of large quantities of fluid media such as water which have been adversely affected by the present ecological conditions prevalent in the world.

There are several problems which have been recognized and solved through the discovery disclosed herein. First, using known techniques in the construction of sterilizer units or in the sterilizing of fluid media, it was recognized that equipment and methods requiring frequent and thorough cleaning of the apparatus was totally infeasible due to the greater demand for sterilizing large amounts of fluid media. Another basic problem associated with prior art devices was that the transparent walls were usually made of fused quartz or special glass which was transparent to germicidal radiation but tended to accumulate a coating of impurities from the water. Since a very thin film of this type will greatly reduce transparency, it is necessary to clean the surfaces frequently and often daily in continuous operation such as explained in Pat. No. 2,457,761. This procedure becomes extremely difficult and inefficient since it requires the shutting down of apparatus and the draining of the water to reach the inner surfaces of the tubing for cleaning.

The first discovery made in conjunction with the present invention was therefore associated with the overcoming of this particular problem. It was necessary to find a material through which fluid media might be conducted without having a buildup of a thin film from impurities contained in the fluid media being treated under ultraviolet radiation. Although as early as 1947 there was a synthetic plastic polytetrafluorethylene called Teflon, which exhibited non-stick properties, it could not be used in conjunction with a sterilizer unit incorporating the use of ultraviolet radiation since it was opaque to that wave length. Although this form of Teflon was known for use in chemical piping in order to take advantage of its chemical inertness and non-stick qualities, there was absolutely no indication that this material could be used in conjunction with such a sterilizing unit. In fact, it was discovered in conjunction with the development of the invention herein that this Teflon material had a particular problem associated with its use in conjunction with ultraviolet radiation. That is, it was found by the present inventor that the synthetic resins referred to by the patentee in Pat. No. 2,457,761, were subject to severe oxidation due to a photochemical change effected over extended periods of time when subjected to ultraviolet radiation. It was therefore necessary to overcome the problem associated with the construction of sterilizing units and the effecting of sterilizing processes to find a material that would not deteriorate over an extended period of time while being subjected to ultraviolet radiation. No one to this point had recognized the problem of such deterioration of synthetic resins, and therefore did not recognize the necessity for overcoming such a disadvantage or providing a solution to such a problem.

As late as 1965, specialists in the field of plastics and other synthetic resins were able to disclose that only very thin type films could be used to transmit ultraviolet rays. A basic problem associated with these known plastic films was that as soon as there was an increase in thickness in the materials used for self-supporting tubing, the ultraviolet rays would be absorbed. In other words, there was no continued transparency associated with the use of known synthetic resins.

PURPOSE OF THE INVENTION

The primary object of this invention is to develop a sterilizing unit for sterilizing fluid media which would be capable of handling large volumes of fluid media over an extended period of time to meet the demands of the day.

Another object of this invention is to find a material which would transmit ultraviolet radiation over an extended period of time without being subjected to a photochemical change causing the deterioration thereof.

A further object of this invention is to provide a method for treating fluid media such as water by irradiating in a continuous operation a flow of material through a tubing composed of material having chemical inertness, non-stick properties and not be subject to deterioration over extended periods of operation.

A still further object of this invention is to provide a sterilizing unit for sterilizing fluid media which will run efficiently over an extended period time by eliminating the need for frequent cleaning of the parts of the unit.

SUMMARY OF THE INVENTION

These objects and other objects of the invention are accomplished through the use of fluorinated ethylene propylene having the characteristics of chemical inertness, so that impurities contained in the fluid media being treated do not stick, thereby prohibiting film buildup on the inner surface of the pipe. Furthermore, it has been discovered that the use of fluorinated ethylene propylene as a material for constructing tubing or pipe used in sterilizer units for fluid media will not deteriorate under long exposure to ultraviolet rays. The present invention is the first time that it has been recognized that a specific type of material will transmit ultraviolet rays over an extended period of time without deterioration thereof.

Further features of the apparatus disclosed herein include the use of a multiple return folded pipe of fluorinated ethylene propylene in combination with germicidal ultraviolet lamps arranged to insure maximum exposure of all portions of the pipe and fluid media to the radiation. In a specific embodiment of this invention, the entire apparatus includes a protective casing enclosing the pipe and the lamps and having an inner surface which is reflective to add to the efficiency of the germicidal action.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
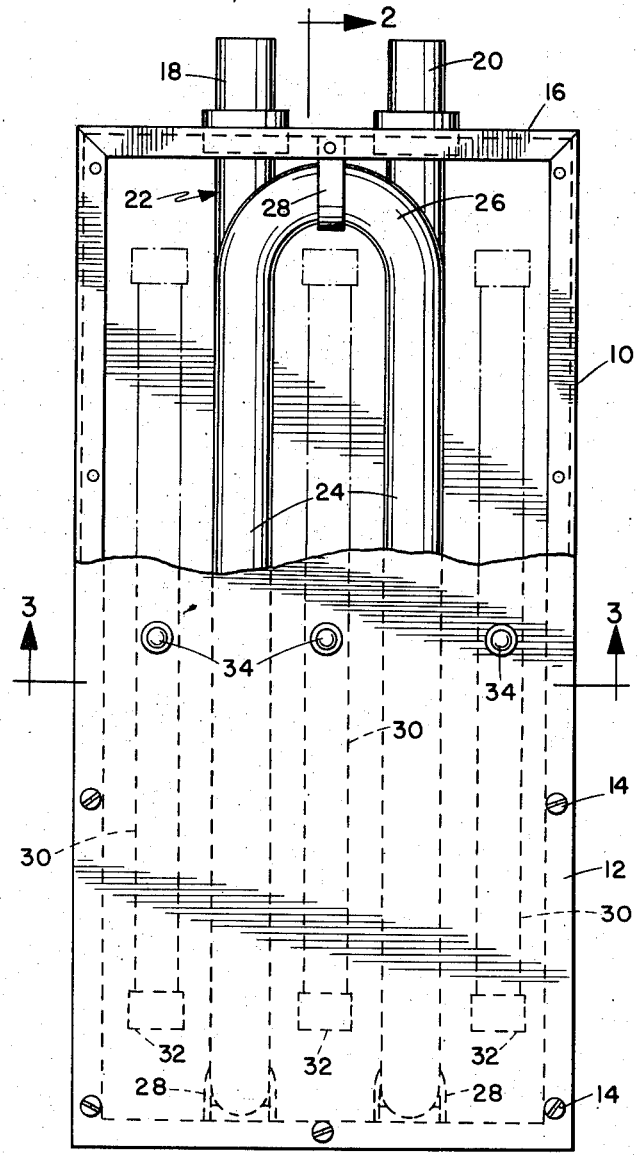
FIG. 1 is a front elevational view with a portion of the cover cut away showing an apparatus made in accordance with this invention.
Figure 2:
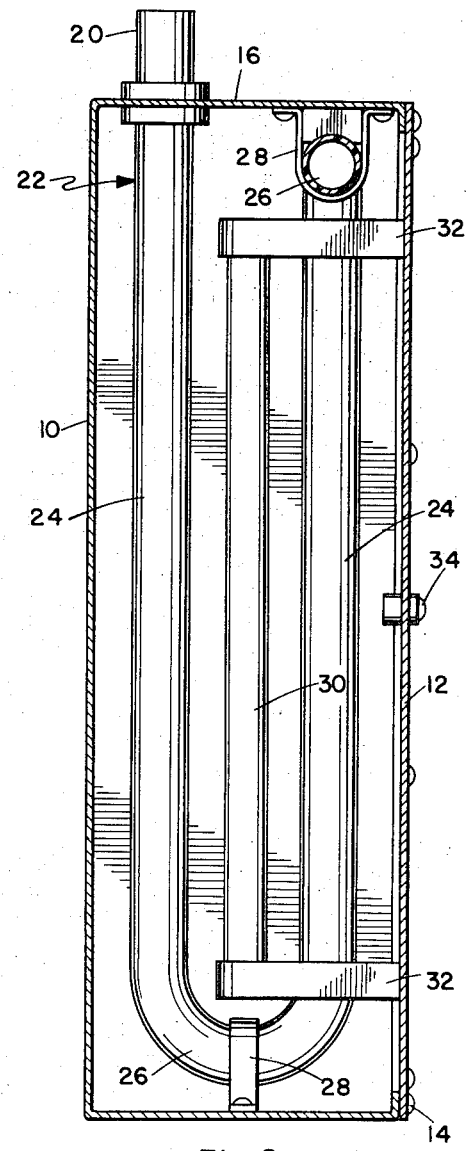
FIG. 2 is a sectional view taken along line 2—2 of FIG. 1.
Figure 3:
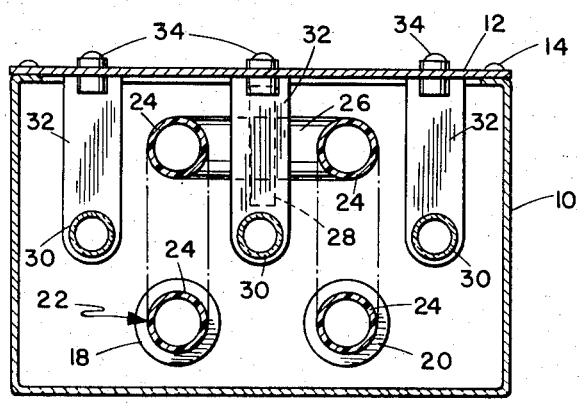
FIG. 3 is a sectional view taken along line 3—3 of FIG. 1.
Figure 4:
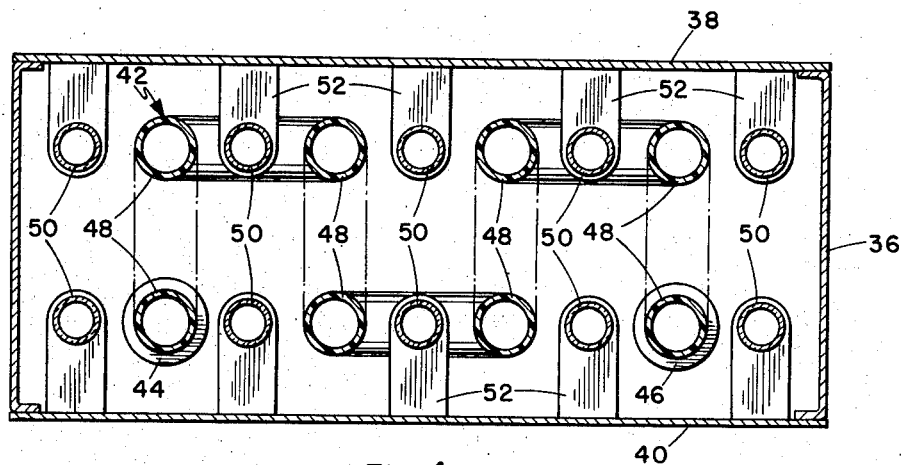
FIG. 4 is a sectional view similar to FIG. 3 showing another embodiment of an apparatus made in accordance with this invention.

More specifically, reference is made to FIGS. 1–3 showing a structural combination which incorporates all the basic principles of an apparatus made in accordance with this invention. A transparent pipe 22 is mounted in casing 10 and includes substantially unidirectional elongated portions 24. The elongated portions 24 are arranged in a substantially square pattern and interconnected by return folded end portions 26 in a continuous run between the inlet 18 and the outlet 20. Each end portion 26 of the pipe 22 is supported by a bracket 28 secured to an adjacent portion of the casing 10. The inlet 18 and outlet 20 are located at the upper casing end 16 and may be provided with any convenient type of coupling or connecting means for connection into a system for fluid media such as water. The casing 10 has a simple rectangular box construction and includes a cover 12 which is secured to the casing 10 by screws 14 or any other suitable means.

In this specific embodiment, germicidal ultraviolet ray lamps are mounted on cover 12. This simplifies construction and servicing of the apparatus. The tubular type ultraviolet ray lamps 30 are mounted in supporting socket members 32 which extend inwardly from the cover 12. Three lamps 30 are used in this particular embodiment. The electrical wiring is conventional and has been omitted for clarity since it does not form a part of the instant invention. The length of the socket members 32 is such that the center lamp 30 is substantially in the center of the square formed by the straight pipe portions 24 as shown in FIG. 3. The other lamps 30 are at opposite sides of the pipe 22 and at the same time are in a row and parallel to the cover 12. Each lamp 30 is thus centered between two substantially unidirectionally elongated pipe portions 24 and the lamps 30 are substantially the same length as the straight pipe portions 24 for maximum efficiency.

All inner surfaces of the casin 10 and cover 12 are reflective to direct as much radiation as possible to the pipe 22. The casing 10 and the cover 12 are metal; the surfaces can be polished to improve reflectivity or any suitable coating or treatment may be used. As a convenience, the cover 12 may be fitted with suitably filtered pilot lenses 34 in alignment with the individual lamps 30 so that an inoperative lamp can be detected.

A most important feature of this invention is directed to the use of fluorinated ethylene propylene in the construction of the pipe 22. This fluorocarbon is known commercially as Teflon FEP. Fluorinated ethylene propylene has been found to be very transparent to germicidal ultraviolet radiation. It is chemically inert to most known substances and has excellent nonstick properties. For this reason, impurities contained in the fluid media such as water being treated in the sterilizing unit do not stick to the inner surfaces of the piping. This characteristic of the pipe 22 thus prohibits film buildup on the inner surface thereof so that the sterilizing unit is operational over an extended period of time. Another property which has been disclosed related to this material is associated with the fact that the sterilizing unit is now capable of operating over long periods. This material has been found not to deteriorate due to photochemical change or oxidation thereof. This fact is not true of other synthetic resins that are available in the prior art. The discovery that this particular type material provides nonstick properties and remains transparent to ultraviolet rays over an extended period of time without deterioration is critical to this invention. Through the discovery associated with the apparatus and process disclosed herein, it has now become commercially feasible and economically practicable to sterilize large quantities of fluid media such as water in continuous operation over extended periods of time. This result has not been available heretofore in conjunction with sterilizing units available in the prior art. Fluorinated ethylene propylene is available in various sizes and can easily be bent by conventional forming techniques to obtain a continuous run of pipe. However, for complex arrangements of the pipe 22, the end portions 26 could be made separately and assembled in an appropriate manner. It should be noted that the pipe 22 is shown as being of reasonably small diameter relative to the lamps 30. This insures adequate penetration of the fluid media by the ultraviolet rays. This is especially important because there is a great variation in ultraviolet transmission properties of water and other media depending on geographical location thereof. While there is no critical limitation of the diameter of the pipe 22, the germicidal efficiency will be dependent on the transmission factor of the particular water being treated in a water sterilizing unit and the effective output of the lamps 30. Thus the pipe 22 should be as small as is practical in accordance with the desired volumetric flow of the sterilizing system.

In another embodiment of a sterilizing unit made in accordance with this invention, a single continuous pipe 42 extends from the inlet 44 to the outlet 46. The pipe 42 is mounted in a casing 36 which has a simple rectangular from with a pair of covers 38 and 40 enclosing opposite sides thereof. The pipe 42 includes a considerable number of convolutions with the straight pipe portions 48 arranged in rows parallel to the two covers 38 and 40. Lamps 50 are mounted in socket members 52 on the covers 38 and 40 and lie between adjacent pairs of pipe portions 48 in parallel alignment with the rows. All of the pipe portions 48 are thus irradiated from both sides as well as from the lamp 50 in the opposite row. The inside surfaces of the casing 36 and covers 38 and 40 are effective to increase the efficiency of the sterilizing unit.

Figure 5:
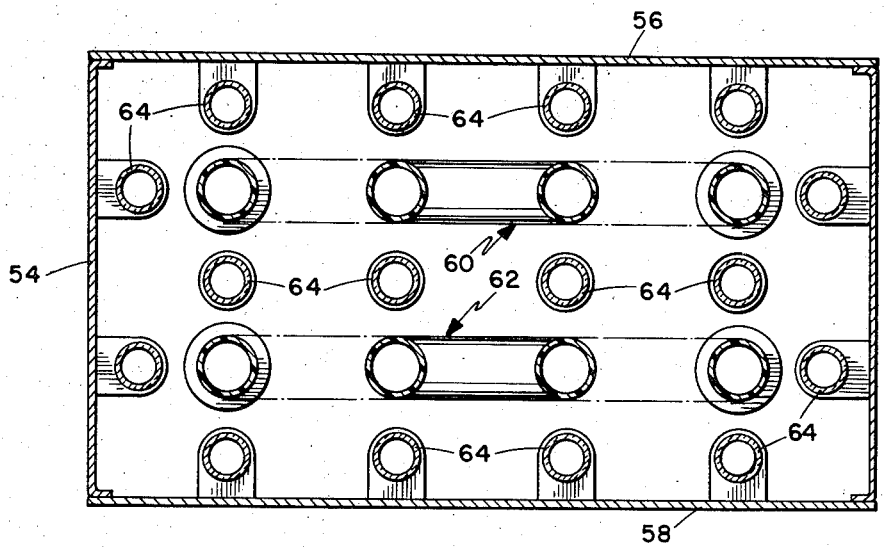
FIG. 5 is a sectional view showing a further embodiment of an apparatus made in accordance with this invention.

In another embodiment as shown in FIG. 5, larger flow rates of the fluid media such as water may be conducted through multiple pipes 60 and 62 which are mounted in parallel alignment in a casing 54. The casing 54 includes a pair of covers 56 and 58. One row of lamps 64 is mounted in the casing 54 between the two pipes 60 and 62. Additional lamps (not shown) are attached to the covers 56 and 58 outside the pipes 60 and 62. Further additional lamps 64 are mounted on the sides of the casing 54 at opposite ends of each row of pipe. This embodiment is particularly useful for commercial and/or laboratory use.

It is evident that many different arrangements of piping and lamps may be used to suit specific requirements. In each instance, the efficient operation is obtained by prolonged exposure of the fluid media such as water in a pipe having a small cross-section which is radiated with ultraviolet from all directions. The apparatus for use in the instant invention is compacted by folding the pipe into a casing which acts as a reflector to control the ultraviolet germicidal radiation. In addition, the casing serves as a protective shield to the operator since direct ultraviolet radiation is harmful to the eyes. Lamp maintenance is simplified by the removable covers and the fluorinated ethylene propylene pipe requires a minimum amount of attention. It is obvious that many types of fluid media may be treated in the sterilizing unit. However, the particular method is directed to the sterilization of water. Consumable liquids such as beverages or the preparation of sterile fluids for various scientific uses may be effected in the device as described herein. It will also be obvious that for certain purposes it may be desirable to concentrate radiation by special reflector arrangements, the techniques of which are well known in the prior art.

While the sterilizer unit for fluid media has been shown and described in detail, it is obvious that this invention is not to be considered as being limited to the exact form disclosed, and that changes in detail and construction may be made therein within the scope of the invention, without departing from the spirit thereof.

I claim:

1. A process of sterilizing a fluid media comprising the steps of:
   (a) providing a pipe composed of fluorinated ethylene propylene to which impurities contained in said fluid media being treated do not stick thereby prohibiting film buildup on the inner surface of the pipe,
   (b) said pipe material being transparent to germicidal ultraviolet radiation,
   (c) passing the fluid media through the pipe, and
   (d) simultaneously exposing said fluid to germicidal ultraviolet radiation by irradiating the fluid media through the wall of said pipe from a radiation source located external to the interior of said pipe whereby the non-stick properties thereof prevent accumulation of deposits on the inner surface thereof and fluid media can flow through the pipe for extended periods of time without any film buildup which would interfere with the germicidal radiation.

2. A process as defined in claim 1 wherein the fluid media is water.

3. In a sterilizer unit for fluid media wherein a self-supporting pipe which is transparent to germicidal ultraviolet radiation is used to conduct the fluid media and a source of germicidal radiation is used to irradiate the fluid media through the pipe, the improvement comprising:
   (a) a germicidal ultraviolet lamp is disposed adjacent said pipe, and
   (b) said pipe is composed of fluorinated ethylene propylene.

4. In a sterilizer unit as defined in claim 3 wherein certain of said germicidal lamps are mounted between adjacent pairs of said elongated pipe portions.

5. In a sterilizer unit as defined in claim 3 wherein the diameter of said fluid media conducting pipe is of an amount sufficient to provide effective penetration of the full cross-section of the fluid media in the pipe by radiation from the germicidal lamp.

6. In a sterilizer unit as defined in claim 3 wherein the pipe has a continuous one-piece construction.

7. In a sterilizer unit as defined in claim 3 wherein a casing is disposed around said pipe and includes inner surfaces which are reflective of said germicidal radiation.

8. In a sterilizer unit as defined in claim 7 wherein said casing has at least one removable cover portion on which certain of said germicidal lamps are mounted.

9. In a sterilizer unit as defined in claim 3 wherein said pipe has multiple convolutions with transparent adjacent elongated portions being in substantially parallel relationship, and
a plurality of said lamps is located adjacent and parallel to said elongated pipe portions.

10. In a sterilizer unit as defined in claim 9 wherein said elongated portions are substantially unidirectional.

11. In a sterilizer unit as defined in claim 9 wherein germicidal lamps are disposed on at least two sides of the elongated portions so that the germicidal lamps irradiate each pipe portion from at least two directions.

References Cited

UNITED STATES PATENTS

| | | | |
|---|---|---|---|
| 1,486,473 | 3/1924 | Ailhaud | 21—Dig. 2 |
| 1,670,217 | 5/1928 | Scheidt | 21—Dig. 2 |
| 2,457,761 | 12/1948 | Wesner | 250—48 XR |
| 2,577,879 | 12/1951 | De Stoutz | 250—48 |
| 2,738,427 | 3/1956 | Wagnon | 250—48 |
| 2,848,623 | 8/1958 | Boynton et al. | 250—48 XR |
| 3,433,946 | 3/1969 | Hardwick | 250—43 |
| 3,462,597 | 8/1969 | Young | 250—43 |

FOREIGN PATENTS

| | | | |
|---|---|---|---|
| 881,096 | 6/1953 | Germany | 250—48 |
| 707,575 | 4/1954 | Great Britain | 250—48 |

OTHER REFERENCES

Halliwell, W. H.: "Heat Resistant Resin for Industrial Uses," Modern Plastics, November 1947 (pp. 99–100).

Du Pont Information Bulletin, "Teflon 100 FEP" (pp. 1, 2, 14 and last page relied on), June 1960.

Du Pont Technical Information Bulletin T-5, "Optical Properties—Teflon FEP," October 1965.

BARRY S. RICHMAN, Primary Examiner

U.S. Cl. X.R.

21—102 R, Dig. 2; 250—43, 48